United States Patent [19]

Yoshida et al.

[11] Patent Number: 4,654,632
[45] Date of Patent: Mar. 31, 1987

[54] ANALOG-TO-DIGITAL CONVERTER

[75] Inventors: Koichi Yoshida; Joji Kawai, both of Hyogo, Japan

[73] Assignee: Mitsubishi Denki Kabushiki Kaisha, Tokyo, Japan

[21] Appl. No.: 732,718

[22] Filed: May 10, 1985

[30] Foreign Application Priority Data

May 11, 1984 [JP] Japan .................................. 59-92912

[51] Int. Cl.$^4$ ............................................. H03M 1/12
[52] U.S. Cl. ................................ 340/347 AD; 235/310
[58] Field of Search ................ 235/310; 340/347 AD; 370/61, 112, 114

[56] References Cited

U.S. PATENT DOCUMENTS 4,345,323  8/1982  Chang .................................. 370/112

OTHER PUBLICATIONS

"AD7581", Data-Acquisition Databook 1982, Analog Devices, Inc., 1982, pp. 11.121 through 11.128.
Sherwin, "Electronic Design", 17, Aug. 16, 1977, vol. 25, pp. 92–99.
Berg, "Electronic Design", vol. 24, No. 25, Dec. 6, 1976, pp. 78–82.

Primary Examiner—Charles D. Miller
Attorney, Agent, or Firm—Bernard, Rothwell & Brown

[57] ABSTRACT

An A/D converter comprising a multiplexer for selecting one of multi-channel analog signals sequentially, an A/D converting circuit for converting a selected analog signal into digital data, a memory for storing converted data in certain address locations, and a control circuit operating on the multiplexer to select an input and addressing the memory in unison in response to an external trigger signal.

4 Claims, 4 Drawing Figures

ANALOG-TO-DIGITAL CONVERTER

BACKGROUND OF THE INVENTION

1. Field of the Invention

The present invention relates to an A/D converter which transforms multi-channel analog signals into digital data.

2. Description of the Prior Art

An A/D converter of this type is disclosed in Data Book AD7581 published by Analog Devices Inc. FIG. 1 shows the arrangement of this A/D converter, which is arranged to be connected to a CPU such as microcomputer. The A/D converter includes an 8-channel multiplexer 1, an A/D converting circuit 2 which converts one of the analog input signals selected by the multiplexer 1 into an 8-bit digital data byte, a dual-port RAM 3 which temporarily stores the 8-bit data byte, a CPU 4, an interface control logic circuit 5 which selects the channel of the multiplexer 1 and addresses the dual-port RAM 3, and a priority arbitration circuit 6 which selects a signal with the higher order precedence out of the write signal and read signal when both signals arise simultaneously.

The operation of the above A/D converter is as follows. Eight analog signals are received by the 8-channel multiplexer 1, and the interface control logic circuit 5 operates on the multiplexer 1 to pass selectively one of the analog signals to the A/D converting circuit 2. The analog signals at the inputs of the multiplexer 1 are fed to the A/D converting circuit sequentially by being scanned from channel 7 to channel 0 at a certain interval, and resultant digital data are stored in predetermined address locations in the dual-port RAM 3.

After A/D conversion for the signal of channel 0 has completed, the next cycle of A/D converting operation begins with channel 7 in response to the signal indicating that the last data has been stored in the dual-port RAM 3. The operation goes on automatically following the clock signal applied to the circuit 5.

The CPU 4 makes access to an address location in the dual-port RAM 3 so that it fetches digital data of the corresponding channel.

FIG. 2 shows the above operation in a timing chart, in which the A/D conversion start signal common for all channels is shown at (a), and the A/D conversion end signal is shown at (b). Time interval t shown at (c) represents the time needed to convert an analog signal into digital data. The time lag, which is the time interval from the starting of A/D conversion to the entry of digital data in the CPU, is expressed as a sum of the conversion time and a time interval from the end of conversion to the read-out of digital data in the RAM by the CPU. The time lag T is shown at (e) for the case, as an example, when the CPU reads out data of channel 6 at a time point shown by (d).

In the conventional system, in which the data read-out operation of the CPU and the state of A/D conversion are in asynchronism with each other, the amount of time lag from A/D conversion to read-out is indeterminate for every channel. For input analog signals which should have a minimum time lag between detection and read-out because of the need to respond to fast varying or crucial signals, such conventional system is unsatisfactory for control purposes because of the variation in time lag, especially when the delay between detection and read-out is substantially increased.

In order to overcome the above problem, it is conceivable that the CPU is placed in an interrupt mode in response to a status signal indicating the end of A/D conversion and the CPU fetches digital data in this mode. This method is effective for minimizing the time lag to an amount substantially equal to the A/D conversion time for all channels, but has an adverse effect that the frequent interrupt operations deteriorate the CPU's processing ability for the main control purpose.

SUMMARY OF THE INVENTION

A prime object of the present invention is to provide an A/D converter which drastically reduces the time lag associated with the operation of delivering A/D converted multi-channel input data sequentially to the CPU.

The invention resides in an A/D converter comprising a multiplexer which sequentially selects one of multi-channel analog input signals, an A/D converting circuit which converts a selected analog signal into digital data, a dual-port memory which stores the converted digital data for the analog signals, and a control circuit including a presettable down-counter which operates to down-count in response to the external trigger and clock input signals and provides signals for selecting the channel of the multiplexer and addressing the dual-port memory.

DETAILED DESCRIPTION OF THE PREFERRED EMBODIMENTS

Figure 1:
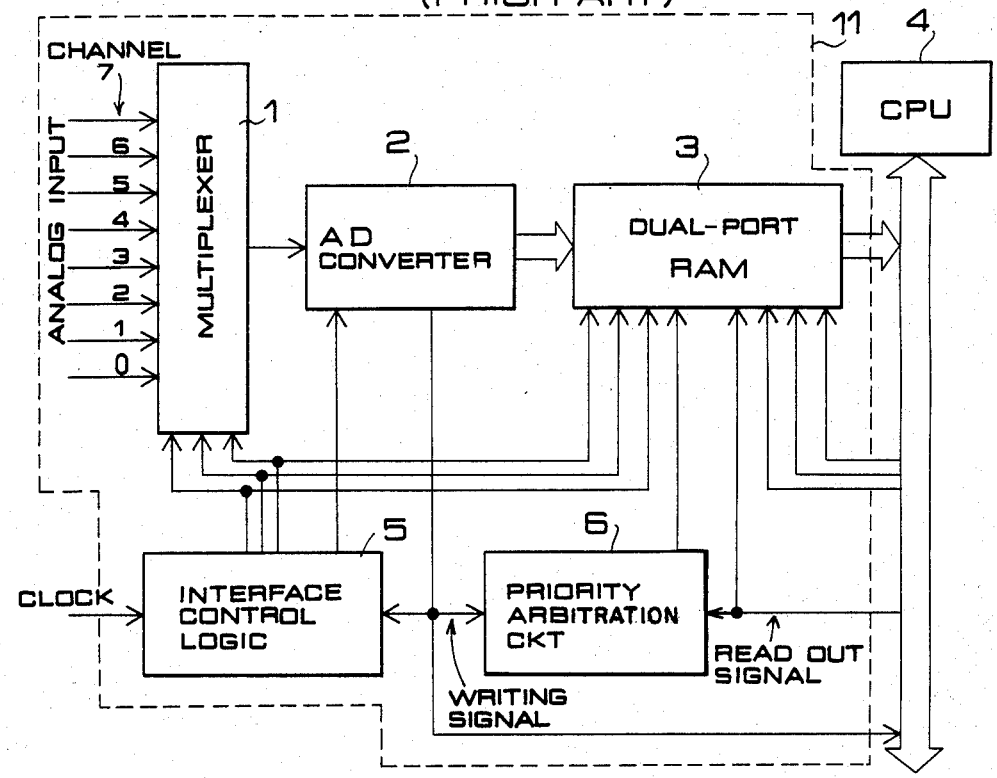
FIG. 1 is a block diagram showing the conventional A/D converter.
Figure 2:
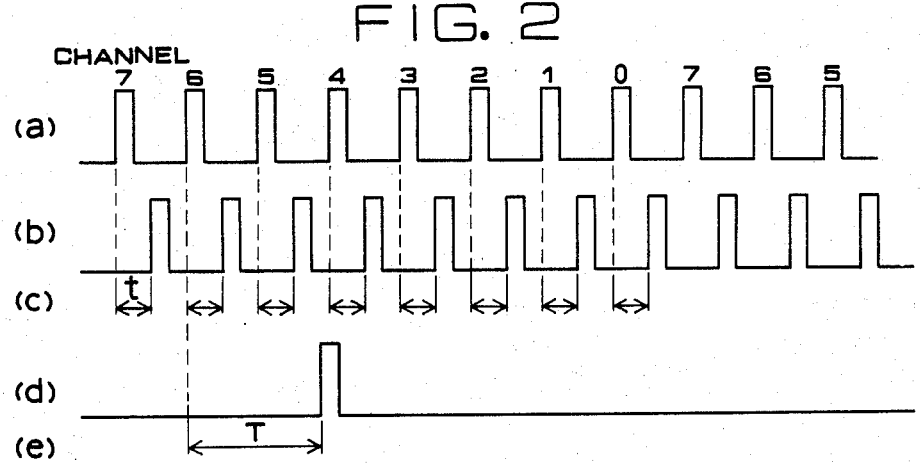
FIG. 2 is a timing chart used to explain the operation of the arrangement shown in FIG. 1.

An embodiment of the present invention will now be described with reference to FIG. 3, in which the same or equivalent portions to those of FIG. 1 are referred to by the common symbols. The arrangement of FIG. 3 includes, in addition to those shown in FIG. 1, a control circuit 10 for selecting a channel of the multiplexer 1 and addressing the RAM 3, the circuit consisting of a frequency division circuit 7, a presettable down-counter 8 and a counter setting device 9.

In this arrangement, when an external trigger is issued to the presettable down-counter 8, a value preset on the setting device 9 is set in the counter 8. Clock pulses provided externally are counted down by the frequency division circuit 7, and the resultant signal is applied to the clock input of the presettable down-counter 8. The presettable down-counter 8 decrements its count from 7 to 0 in response to the clock input, and the binary count value is outputted. When a clock pulse is applied after the count has reached 0, a borrow signal is generated to halt the operation of the frequency divider 7. Then, the clock input to the presettable down-counter 8 is suspended, and the count operation ceases. The halt state lasts until the next external trigger is issued.

The binary value provided by the presettable down-counter 8 is used as a command signal for selecting the channel of the analog inputs of the multiplexer 1. As the binary value varies from 7 through 0, the analog input on the multiplexer 1 is switched from channel 7 through channel 0 sequentially. At the same time, the output of the presettable down-counter 8 is used to address the dual-port RAM 3, so that data derived from a selected channel of the multiplexer 1 is stored in an address location of the dual-port RAM 3 correspondingly.

During the above operation, each clock pulse applied to the presettable down-counter 8 is used as a conversion start command to the A/D converting circuit 2, and a corresponding conversion end signal issued by the A/D converting circuit 2 is used as a write signal for the dual-port RAM 3.

After the analog signal of channel 0 has been converted and its digital data has been stored in the dual-port RAM 3, an interrupt request signal, e.g., the borrow or zero state signal from the counter 8, is applied to the CPU 4. The CPU 4 responds to the interrupt request signal to make access to the dual-port RAM 3, thereby fetching input data on an arbitrary channel or channels. In order that a location of the dual-port RAM 3 addressed for reading by the CPU 4 is not overwritten by a newly converted data, the priority arbitration circuit 6 is provided for validating one of the write signal and read signal at one time. However this circuit is not needed if it is obvious that the write and read signals do not occur simultaneously for the same address.

Since the CPU 4 receives data from the A/D converting circuit 2 through the dual-port RAM 3, the CPU 4 can fetch data independently of the converting operation. On this account, the CPU 4 does not need to suspend the processing operation throughout the converting period, but merely needs an interrupt operation once in eight A/D converting operations.

Figure 3:
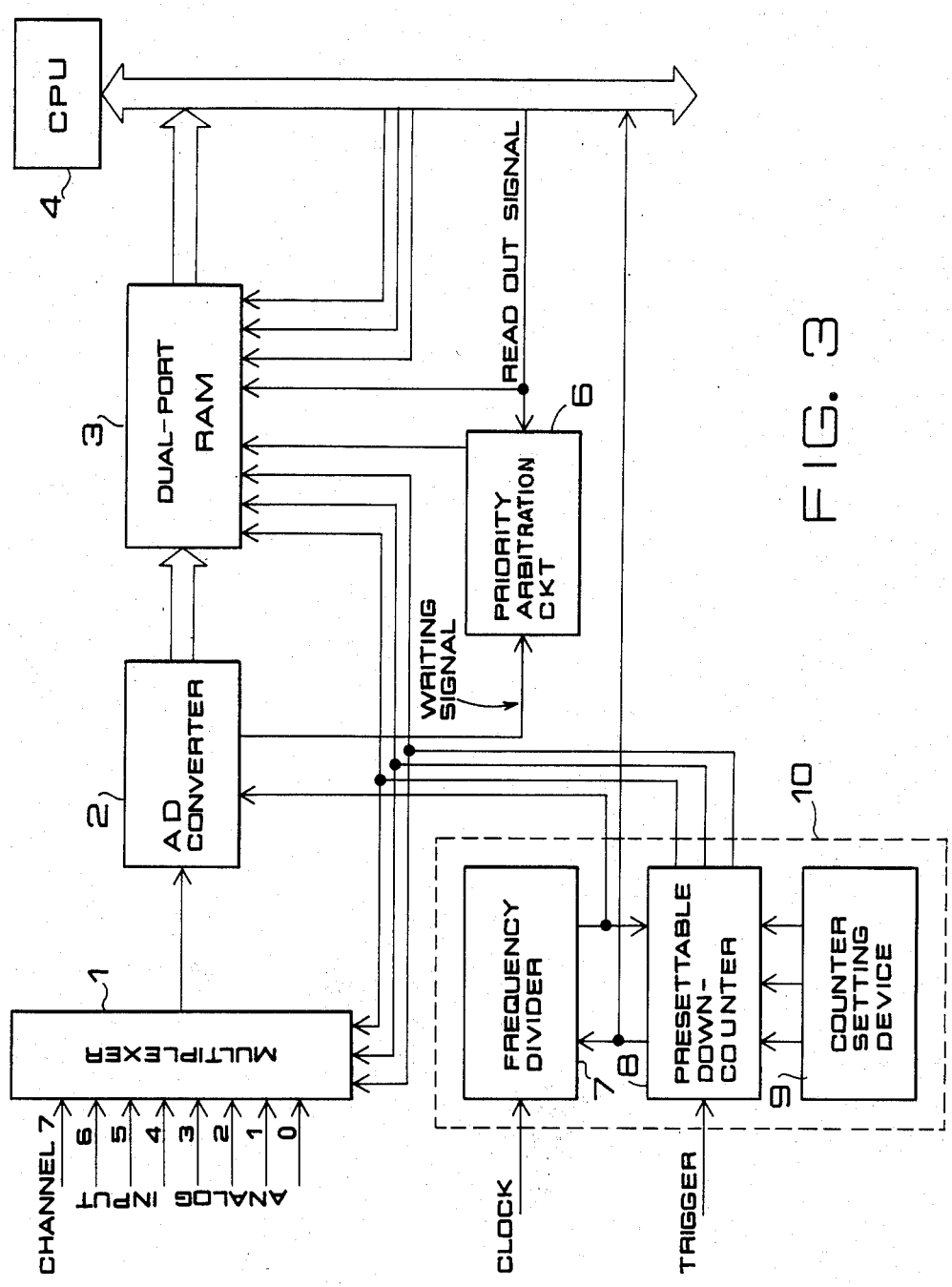
FIG. 3 is a block diagram showing the A/D converter according to the present invention.
Figure 4:
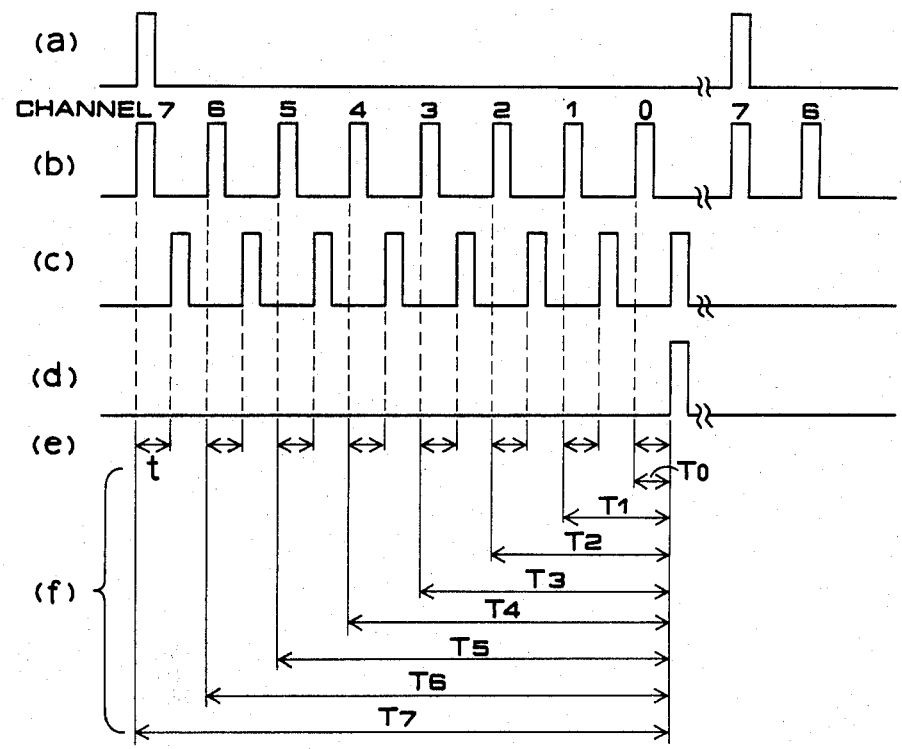
FIG. 4 is a timing chart showing the operation of the arrangement of FIG. 3.

FIG. 4 shows in a timing chart the operation of the foregoing embodiment shown in FIG. 3. The timing chart includes the external trigger signal indicated by (a), the A/D conversion start signal indicated by (b), the A/D conversion end signal, i.e., the RAM write signal, indicated by (c), and the interrupt signal indicated by (d). The A/D conversion time t is shown at (e), and the time lag $T_0$ through $T_7$ from the A/D conversion start time, i.e., sampling time, for respective channels to the read-out of converted data by the CPU 4 is shown at (f) for channels 0 through 7 from top to bottom correspondingly.

Accordingly, each channel has a definite length of time lag ($T_0$–$T_7$), allowing the allocation of a fast-varying input and highly critical input to channels with short time lag in the ascending order from channel 0. For channel 0, the time lag is substantially equal to the A/D conversion time.

Although the foregoing embodiment is of 8-channel analog inputs, the number of channels can be varied arbitrarily by alteration of the capacity of the dual-port RAM and the preset value to the counter. The resolution of the A/D converter can be chosen arbitrarily by setting up the number of bits of the dual-port RAM depending on the resolution of the A/D converting circuit.

The read-out by the CPU in the above embodiment is initiated identically to a conventional A/D converter by feeding the interrupt signal to the CPU, as described above but contrary to the conventional multiplexing A/D converter with memory where the A/D conversion cycle is initiated by the interrupt or A/D cycle completion signal, the A/D conversion cycle is initiated by the external trigger input of the presettable down-counter.

According to the present invention, as described above, the A/D conversion start command is given from outside, so that each input channel has a definite time lag before providing a converted output. In consequence, the time lag of critical input data can be minimized by being allocated to a channel with a short time lag. In addition, the decreased frequency of the A/D converting interrupt operation favors the CPU with an enhanced processing ability for its main task.

What is claimed is:

1. An analog-to-digital converter with analog multiplexing and digital memory comprising:
   an analog multiplexer having a plurality of analog inputs, an analog output and input address means for selectively connecting one of the analog inputs to the analog output;
   an analog-to-digital converter having an analog input connected to the analog output of the multiplexer and having digital outputs;
   a dual port digital memory including (a) data inputs connected to the digital outputs of the converter, (b) input address means for selecting a memory address for storing data from the data inputs, (c) data outputs connectable to a computer data bus, and (d) output address means operable by a computer for selecting a memory address from which data is presented on the data outputs; and
   control means including (a) a presettable down counter having outputs connected to the input address means of the multiplexer and the memory, (b) presetting means including an external trigger input for presetting the counter to a preset value, (c) clock input means for decrementing the counter, and (d) disablement means responsive to a zero count in the counter for preventing decrementation of the counter.

2. An analog-to-digital converter according to claim 1 further comprising an early arrival priority circuit for arbitrating the read operation for data stored in said dual-port memory and the writing operation for said digital data in said dual-port memory.

3. An analog-to-digital converter according to claim 1 further comprising a priority arbitration circuit which prevents said dual-port memory, while reading out data stored in one address location, from being overwritten in said one address location by data from the analog-to-digital converter.

4. An analog-to-digital converter according to claim 1, wherein said disablement means generates an interrupt request signal for a computer in response to a zero count in the counter.

* * * * *